(12) United States Patent
Han

(10) Patent No.: US 7,929,171 B2
(45) Date of Patent: Apr. 19, 2011

(54) METHOD OF TRANSMITTING CHANGED PRINTER INFORMATION IN REAL TIME AND NETWORK PRINTER USING THE SAME

(75) Inventor: Dong-hyeop Han, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/654,443

(22) Filed: Dec. 18, 2009

(65) Prior Publication Data

US 2010/0157367 A1 Jun. 24, 2010

Related U.S. Application Data

(62) Division of application No. 10/197,504, filed on Jul. 18, 2002, now Pat. No. 7,660,005.

(30) Foreign Application Priority Data

Dec. 20, 2001 (KR) .................. 2001-81746

(51) Int. Cl.
*G06F 15/00* (2006.01)
*G06F 3/12* (2006.01)
*G06K 1/00* (2006.01)
(52) U.S. Cl. ...................................... 358/1.15; 358/1.13
(58) Field of Classification Search ............... 358/1.15, 358/1.1, 1.13, 1.14, 1.18
See application file for complete search history.

(56) References Cited

U.S. PATENT DOCUMENTS 6,219,153 B1 4/2001 Kawanabe et al.
6,975,415 B2 12/2005 Yamade

FOREIGN PATENT DOCUMENTS

JP 7-248889 9/1995

OTHER PUBLICATIONS

Notice of Allowance dated Sep. 18, 2009 for related U.S. Appl. No. 10/197,504.
Notice of Panel Decision from Pre-Appeal Brief Review dated Jul. 28, 2009 for related U.S. Appl. No. 10/197,504.
Final Office Action dated Apr. 15, 2009, 2009 for related U.S. Appl. No. 10/197,504.
Office Action dated Sep. 2, 2008 for related U.S. Appl. No. 10/197,504.
Advisory Action dated May 9, 2008 for related U.S. Appl. No. 10/197,504.
Final Office Action dated Feb. 7, 2008 for related U.S. Appl. No. 10/197,504.

(Continued)

*Primary Examiner* — Douglas Q Tran
(74) *Attorney, Agent, or Firm* — Staas & Halsey LLP

(57) ABSTRACT

A method of transmitting printer information which can inform a host of changed printer information in real time whenever printer information changes and a network printer using the method. The method includes determining whether or not the printer information has changed and transmitting the changed printer information in real time to a communications network or a predetermined program which communicates with the network printer. The network printer includes a printer information change determination circuit which determines changes in printer information, and a changed information notification module which transmits in real time the changed printer information to a communications network or a predetermined program which communicates with the network printer. The changed information notification module transmits the printer information to the communications network or the predetermined program when the network printer is turned on.

16 Claims, 4 Drawing Sheets

OTHER PUBLICATIONS

Office Action dated Jul. 24, 2007 for related U.S. Appl. No. 10/197,504.
Advisory Action dated Apr. 25, 2007 for related U.S. Appl. No. 10/197,504.
Final Office Action dated Jan. 22, 2007 for related U.S. Appl. No. 10/197,504.
Office Action dated Aug. 1, 2006 for related U.S. Appl. No. 10/197,504.
Restriction Requirement dated Apr. 20, 2006 for related U.S. Appl. No. 10/197,504.
Restriction Requirement dated Feb. 22, 2006 for related U.S. Appl. No. 10/197,504.
Office Action dated Nov. 10, 2005 for related U.S. Appl. No. 10/197,504.

FIG. 4

| IP | UDP/TCP | CHANGE/SET INFORMATION | REQUEST/RESPONSE INFORMATION | IDENTIFIER | IP ADDRESS OF PRINTER | SUBNET MASK | GATEWAY |

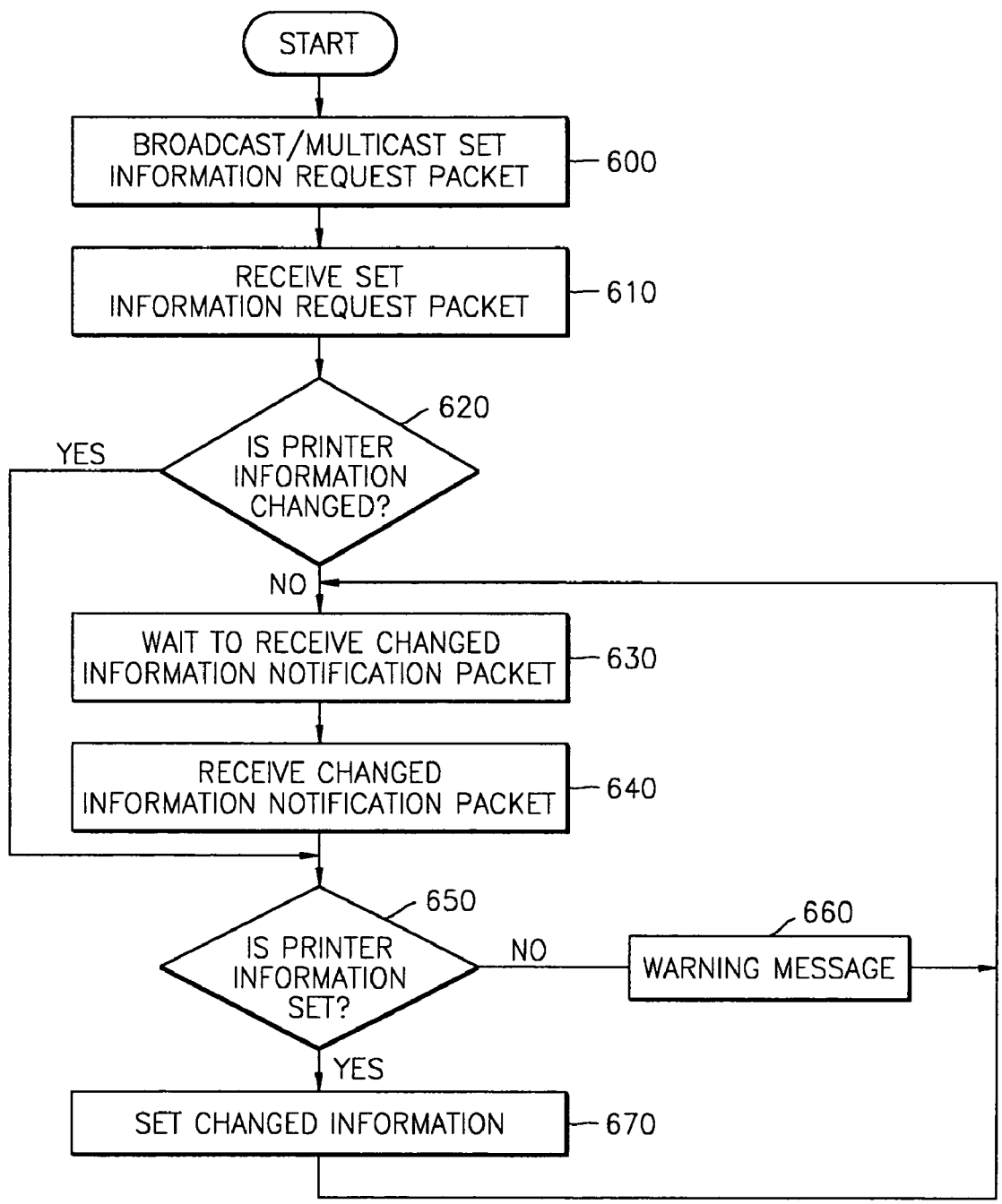

METHOD OF TRANSMITTING CHANGED PRINTER INFORMATION IN REAL TIME AND NETWORK PRINTER USING THE SAME

CROSS-REFERENCE TO RELATED APPLICATIONS

This application claims the benefit of Korean Application No. 2001-81746, filed Dec. 20, 2001, in the Korean Industrial Property Office, the disclosure of which is incorporated herein by reference. This application is a divisional application of U.S. application Ser. No. 10/197,504 filed Jul. 18, 2002, now U.S. Pat. No. 7,660,005.

BACKGROUND OF THE INVENTION

1. Field of the Invention

The present invention relates to a printer, and more particularly, to a method of transmitting changed printer information in real time to a network, and a method of changing printer information set in a network printer and a host.

2. Description of the Related Art

FIG. 1 is a diagram of a printing system having a conventional network printer. The printing system includes a host 10, a communications network 30, and a network printer 40. The host 10 has network printer related programs 20 (hereinafter referred to as "programs") which communicate with the network printer 40 through the communications network 30.

The programs 20 set printer information of the network printer 40 in the host 10, and using the printer information, communicate with the network printer 40 and perform needed functions.

A port monitor and a status monitor can be used as the programs. The port monitor transmits printing data to the network printer corresponding to printer information, and the status monitor receives printer information from the network printer 40 corresponding to the printer information.

For example, in a WINDOWS® system, programs 20 store printer information in an init file (e.g., "printer.ini") or the WINDOWS® registry, and using the printer information, communicate with the network printer 40.

That is, when the programs 20 are installed in the host 10, the programs 20 receive printer information of the network printer 40 linked to the network 30, set (or store) the printer information in a predetermined area of the host 10, and using the set printer information, communicate with the network printer 40.

However, if the printer information changes, the changed printer information is not transmitted to the host 10, and therefore the programs 20 cannot communicate with the network printer 40. Accordingly, the user must install the programs 20 again whenever the printer information changes, or must change the printer information of the host 10 after obtaining changed printer information.

Also, when the printer information changes, users of the programs 20 cannot use the programs 20 because the user does not know the changed printer information. In addition, when the printer information changes, it may be incorrectly determined that errors occurred in the programs 20 or in the network printer 40 because changed printer information cannot be known in real time.

SUMMARY OF THE INVENTION

Accordingly, it is an object of the present invention to provide a method of notifying a host of changed printer information in real time whenever printer information changes, and a network printer using the same.

It is another object of the present invention to provide a method and host to confirm printer information.

Additional objects and advantages of the invention will be set forth in part in the description which follows and, in part, will be obvious from the description, or may be learned by practice of the invention.

The foregoing objects and advantages are also achieved by providing a method of transmitting printer information of a network printer, the method including determining whether or not the printer information is changed printer information, and transmitting the changed printer information in real time to a communications network or a predetermined program which communicates with the network printer.

The foregoing objects and advantages are also achieved by providing a network printer which transmits changed printer information, including a printer information change determination circuit which determines changes in printer information, and a changed information notification module which transmits in real time the changed printer information to a communications network or a predetermined program which communicates with the network printer.

According to an aspect of the present invention, the changed information notification module transmits the printer information to the communications network or the predetermined program when the network printer is turned on.

The foregoing and other objects of the invention are achieved by providing a method of changing first printer information set in a host, the method including transmitting a set information request packet to a network printer; receiving a set information response packet corresponding to the set information request packet from the network printer; comparing the first printer information with second printer information of the set information response packet, and changing the first printer information into the second printer information if the first printer information is not the same as the second printer information.

According to an aspect of the present invention, the transmitting, receiving, or comparing are performed by a predetermined program communicating with the network printer.

According to another aspect of the present invention, the transmitting is performed when a predetermined program communicating with the network printer starts, or is performed periodically.

The foregoing objects and advantages are also achieved by providing a method of changing printer information, the method including receiving first printer information transmitted from a network printer; comparing the first printer information with second printer information stored in a host; and changing the second printer information into the first printer information according to the compared result.

According to an aspect of the present invention, if the first printer information changes, the second printer information is changed in real time.

The foregoing objects and advantages are also achieved by providing a method of changing printer information, the method including receiving changed printer information at a host when printer information of a network printer changes; comparing printer information set in the host with the changed printer information; and changing the printer information set in the host into the changed printer information according to the compared result.

According to an aspect of the present invention, the printer information set in the host is changed into the changed printer information in real time.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 4 is a diagram of a transmission packet format according to the present invention; and FIG. 5 is a flowchart showing a method of changing printer information set in a host according to another embodiment of the present invention.

DETAILED DESCRIPTION OF THE PREFERRED EMBODIMENTS

Figure 1:
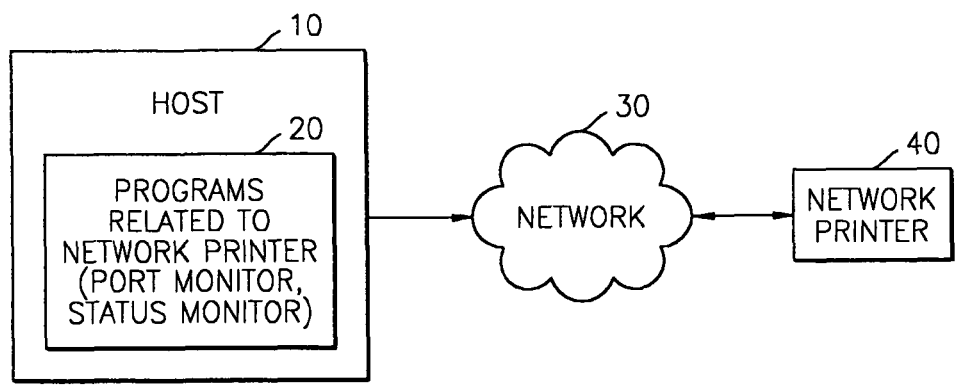
FIG. 1 is a diagram of a printing system having a conventional network printer.

Reference will now be made in detail to the present preferred embodiments of the present invention, examples of which are illustrated in the accompanying drawings, wherein like reference numerals refer to like elements throughout.

Figure 2:
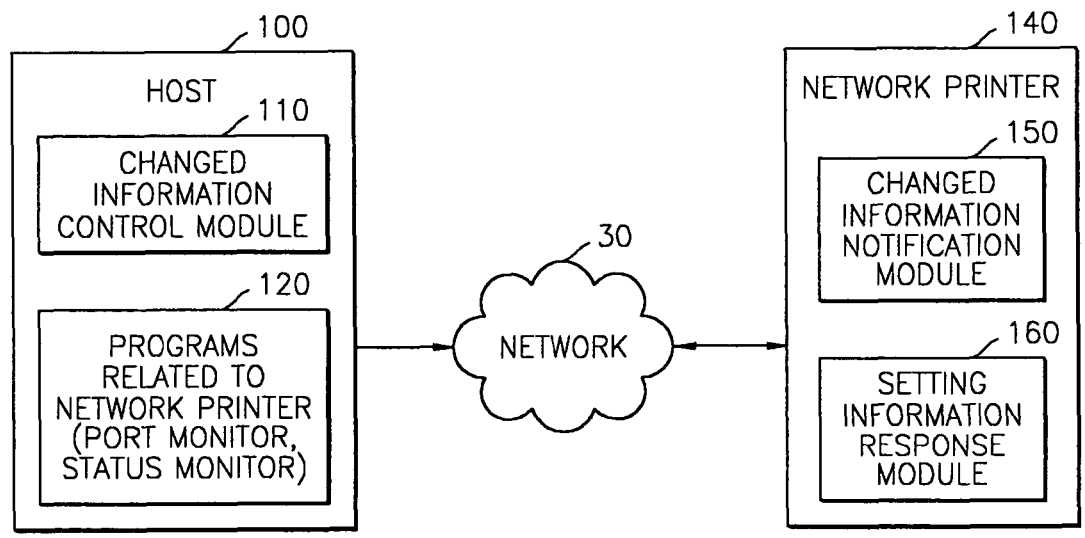
FIG. 2 is a diagram of a printing system having a network printer according to the present invention.

FIG. 2 is a diagram of a printing system having a network printer according to an embodiment of the present invention. The printing system of FIG. 2 includes a host 100 and a network printer 140 that are linked to each other through a communications network 30. The network printer 140 may be linked to one or more hosts through the communications network 30, but for convenience of explanation, only one host 100 is shown in FIG. 2.

The host 100 includes a changed information control module 110 and network printer related programs 120. The changed information control module 110 compares present printer information in the host 100 with changed printer information, and according to the result of the comparison, can change the present printer information into the changed printer information. The detailed operation of the changed information control module 110 will be explained later, referring to FIG. 5.

The network printer related programs 120 (hereinafter referred to as "programs") are installed in the host 100, and communicate with the network printer 140.

The programs 120 may include a port monitor or a status monitor. The port monitor transmits printing data to the network printer 140 corresponding to the printer information set in the host 100, and the status monitor receives printer information from the network printer 140 corresponding to the printer information set in the host 100.

The network printer 140 includes a changed information notification module 150 and setting information response module 160. The changed information notification module 150 transmits changed printer information to the network 130 or the host 100 whenever printer information of the network printer 140 changes. In addition, the network printer 140 further includes a printer information change determining circuit (not shown) which determines whether or not printer information has changed. However, the changed information notification module 150 may have the function of the printer information change determining circuit.

Therefore, when a plurality of the hosts 100 are linked to the network 130, each host can receive the changed printer information in real time. The operation of the changed information notification module 150 will be explained in detail referring to FIG. 3. The setting information response module 160 transmits a setting information response packet to the programs 120 in response to a setting information requesting packet.

FIG. 4 is a diagram of a transmission packet format according to the present invention. Referring to FIG. 4, the transmission packet format is used in a network based on a Transmission Control Protocol/Internet Protocol (TCP/IP). As a network protocol, a User Datagram Protocol (UDP) or TCP, or Internetwork Packet eXchange (IPX), or Sequenced Packet eXchange (SPX) can be used.

A data format contains change/set information and request/response information. For example, each 4-bit flag may be assigned to the change/set information or the request/response information, or only 1 bit among the 4 bits may be used while the remaining 3 bits are reserved. An identifier contains the hardware address of the network printer 140. For example, the identifier may be 6 bytes. The IP address of the printer, a subnet mask, and a gateway may contain changed printer information or set printer information. For example, the IP address, the subnet mask, and the gateway may be 4 bytes, respectively.

Figure 3:
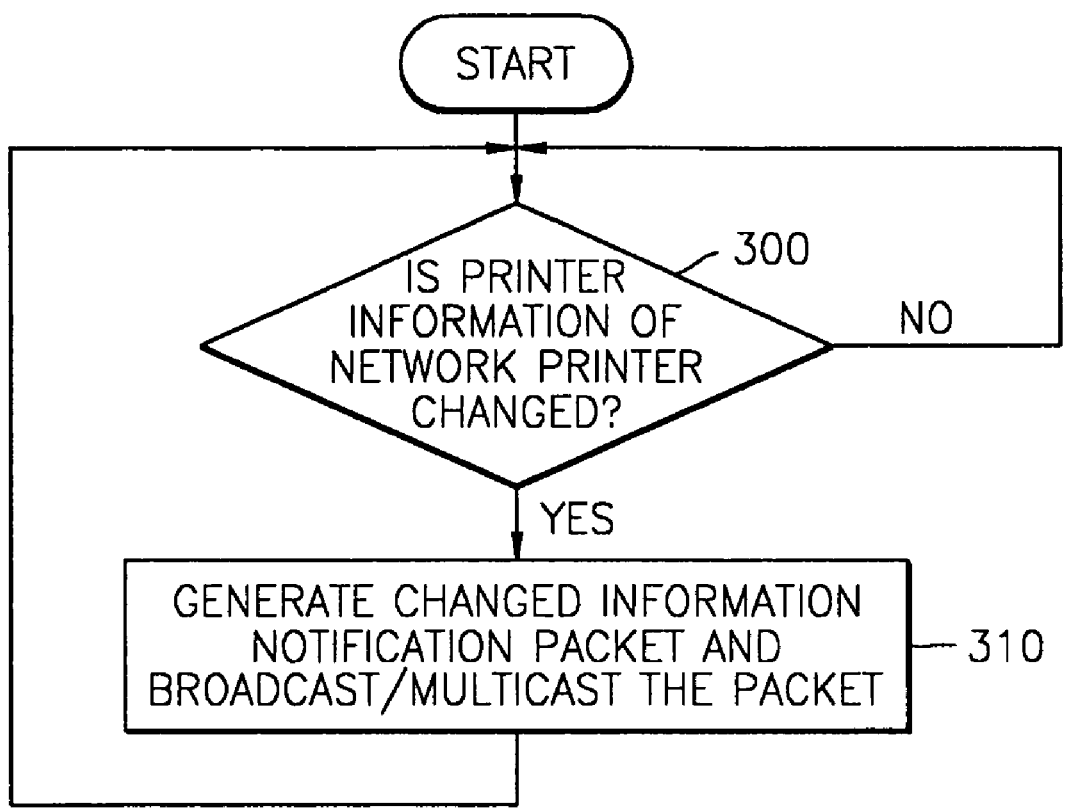
FIG. 3 is a flowchart showing a method of transmitting changed printer information by a network printer to a host according to an embodiment of the present invention.

FIG. 3 is a flowchart showing a method of transmitting changed printer information by the network printer 140 to the host 100 according to an embodiment of the present invention. The printer information change determining circuit or the changed information notification module 150 determines whether or not the printer information of the network printer 140 has changed in operation 300. When the printer information of the network printer 140 is changed, the changed information notification module 150 generates a changed information notification packet of the type shown in FIG. 4, and transmits the changed information notification packet to the network 130 by broadcasting, multicasting, or unicasting the packet in operation 310.

The changed information notification packet has a changed information flag, a request information flag, the hardware address of the network printer 140, the IP address of the changed printer, the subnet mask and gateway. Therefore, the changed information notification packet includes changed printer information.

The changed information control module 110 of the host 100 or the programs 120 receives the changed information notification packet, checks the network printer 140 communicating with the host 100, compares the changed printer information of the changed information notification packet with the printer information currently set in the host 100, and informs the user whether or not to change the set printer information to the changed printer information.

If the user wants to change the set printer information into the changed printer information, the changed information control module 110 of the host 100 or the programs 120 changes the set printer information into the changed printer information. Therefore, since the network printer 140 can transmit the changed printer information to the host in real time, the host 100 communicating with the network printer 140 can change the set printer information into the changed printer information in real time.

Accordingly, since the printer information of the host 100 is always maintained to be accurate, the programs 120 always normally communicate with the network printer 140. In addition, it is not necessary to re-install the programs 120 whenever the printer information changes.

FIG. 5 is a flowchart showing a method of changing printer information set in a host according to another embodiment of the present invention. When the programs 120 are executed, in order to check whether or not the printer information currently set in the host 100, the programs 120 or the changed information control module 110 generates an information request packet and transmits the packet to the network 130 by broadcasting, multicasting, or unicasting the packet (operation 600).

The set information request packet includes a set information flag, a request information flag, the hardware address of the network printer 140, the IP address of the currently set printer, the subnet mask and gateway. Therefore, the set information notification packet includes the printer information currently set in the host 100.

In response to the set information request packet, the setting information response module 160 of the network printer 140 also transmits a set information response packet to the network 130 by broadcasting, multicasting, or unicasting the packet. The set information response packet includes a set information flag, a response information flag, the hardware address of the network printer 140, the IP address of the current printer, the subnet mask and gateway. Therefore, the set information response packet includes the printer information of the current network printer 140.

The programs 120 or the changed information control module 110 receives the set information response packet from the setting information response module 160 (operation 610), and determines whether or not the printer information of the current network printer 140 has changed (operation 620). In this case, the changed information control module 110 compares the IP address of the printer 140, the subnet mask and gateway of the set information response packet with the IP address of the printer 140, the subnet mask and gateway of the printer currently set in the host 100.

When the result of the determination in operation 620 indicates that the printer information of the network printer 140 has changed, the programs 120 or the changed information control module 110 informs the user that the printer information currently set in the host 100 may be changed into the changed printer information (operation 650). If the user wants to change the printer information currently set in the host 100 into the changed printer information, the programs 120 or the changed information control module 110 of the host 100 changes the printer information currently set in the host 100 into the changed printer information (operation 670).

The programs 120 or the changed information control module 110 changes the printer information currently set in the host 100 into the changed printer information and then returns to a wait state to receive a changed information notification packet (operation 630). This is to receive changed information in real time whenever the printer information of the network printer 140 changes.

If the user does not change the printer information currently set in the host into the changed printer information, the changed information control module 110 outputs a warning message (operation 660). The warning message informs the user that the printer information currently set in the host 100 is different from the printer information of the current network printer 140.

If the printer information is not changed in operation 620, or if the printer information set in operation 670 is changed into the changed printer information, the host 100 maintains the wait state to receive changed printer information in real time in operation 630.

When the printer information of the network printer 140 has changed, the programs 120 or the changed information control module 110 receives the changed information notification packet output from the changed information notification module 150 in operation 640, and informs the user that the printer information currently set in the host 100 may be changed into the changed printer information in operation 650.

In addition, since the changed information, notification module 150 can inform the host 100 of the printer information of the current network printer 140 whenever the network printer 140 is turned on, the programs 120 or the changed information control module 110 which communicates with the network printer 140 can be informed of the printer information in real time.

Also, the programs 120 or the changed information control module 110 periodically check the printer information currently set in the host 100, and if the printer information of the network printer 140 has changed, can change the printer information currently set in the host 100 into the changed printer information.

As described above, the printer information transmitting method and the network printer according to the present invention can transmit changed printer information in real time, and therefore, the programs communicating with the network printer can always maintain accurate printer information.

In addition, the printer information transmitting method and the network printer according to the present invention can transmit changed printer information to the host in real time even when the printer information has changed, and therefore, it is not necessary to re-install the programs of the host again whenever the printer information changes.

Also, the printer information transmitting method and the network printer according to the present invention can transmit changed printer information to the host in real time even when the printer information has changed, and therefore, it is not necessary to change the printer information currently set in the host into the changed printer information whenever the printer information changes.

Also, according to the printer information transmitting method and the network printer according to the present invention, it is not necessary for a network printer administrator to inform the user of the changed printer information even when the printer information is changed by the network printer administrator.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method of transmitting printer information which a host needs to use in order to communicate with a network printer to the host connected to the network printer, in the network printer, the method comprising;
   comparing printer information set the network printer with the inputted printer information;
   determining whether printer information is changed or not based on the comparison result; and
   transmitting the changed printer information from the network printer to a communications network or a predetermined program that communicates with the network printer, if printer information is changed,
   wherein the transmitted printer information includes information which is required by the host to establish subsequent communication with the network printer.

2. The method of claim 1, wherein the transmitting comprises:
   packeting the changed printer information; and transmitting the packetized printer information to the communications network or the predetermined program by broadcasting, multicasting, or unicasting.

3. The method of claim 1, wherein the predetermined program is installed in the host.

4. The method of claim 1, wherein the transmitted printer information comprises an IP address associated with the network printer, which has been recently changed.

5. The method of claim 1, wherein the transmitted printer information comprises subnet mask information associated with the network printer, which has been recently changed.

6. The method of claim 1, wherein the transmitted printer information comprises gateway information associated with the network printer, which has been recently changed.

7. The method of claim 1, wherein the transmitting comprises:
   transmitting the changed printer information from the network printer to a communications network or a predetermined program that communicates with the network printer, if printer information is changed without a request from the host.

8. A network printer which transmits printer information which a host needs to use in order to communicate with the network printer to the host connected to the network printer, comprising:
   a printer information change determination circuit which compares printer information set the network printer with the inputted printer information and determines whether printer information is changed or not based on the comparison result; and
   a changed information notification module which transmits the changed printer information to a communications network or a predetermined program which communicates with the network printer, if printer information change determination circuit determines that printer information is changed,
   wherein the transmitted printer information includes information which is required by the host to establish subsequent communication with the network printer.

9. The network printer of claim 8, wherein the changed printer information is packetized and transmitted to the communications network or the predetermined program by broadcasting, multicasting, or unicasting.

10. The network printer of claim 8, wherein the predetermined program is installed in the host.

11. The network printer of claim 8, wherein the transmitted printer information comprises an IP address associated with the network printer, which has been recently changed.

12. The network printer of claim 8, wherein the transmitted printer information comprises subnet mask information associated with the network printer, which has been recently changed.

13. The network printer of claim 8, wherein the transmitted printer information comprises gateway information associated with the network printer, which has been recently changed.

14. The network printer of claim 8, wherein the changed information notification module transmits the changed printer information to the communications network or the predetermined program when the network printer is turned on.

15. The printing network of claim 8, wherein the changed printer information is transmitted in a packet having a network protocol comprising a User Datagram Protocol, Transmission Control Protocol, Internetwork Packet eXchange, or sequence Packet eXchange.

16. The network printer of claim 8, wherein the changed information notification module transmits the changed printer information to the communications network or the predetermined program without a request of the host.

* * * * *